Feb. 5, 1924.
W. WAGNER
ART OF WELDING METAL RECEPTACLES
Filed Oct. 5, 1922
1,483,027
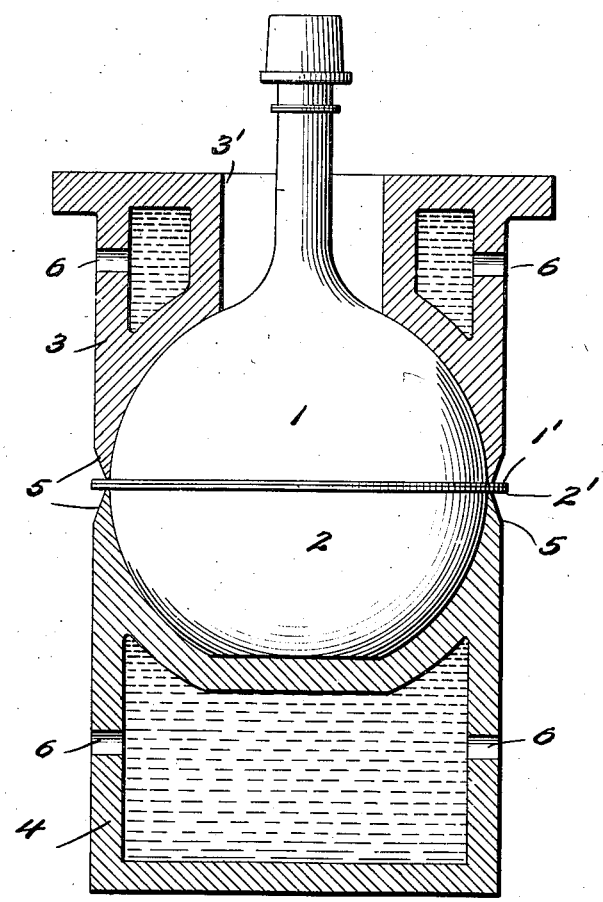
Inventor
W. Wagner
By F. K. Bryant
Attorney Patented Feb. 5, 1924.

1,483,027

UNITED STATES PATENT OFFICE.

WALTER WAGNER, OF CHICAGO, ILLINOIS.

ART OF WELDING METAL RECEPTACLES.

Application filed October 5, 1922. Serial No. 592,665.

*To all whom it may concern:*

Be it known that I, WALTER WAGNER, a citizen of Poland, residing at Chicago, in the county of Cook and State of Illinois, have invented certain new and useful Improvements in the Art of Welding Metal Receptacles, of which the following is a specification.

The present invention relates to a device employed by me in the process of manufacturing all metal vacuum bottles and particularly to that stage of the process wherein the meeting edges of the upper and lower sections of the inner wall of the bottle are welded together.

In an application filed by me on March 23, 1922, bearing Serial No. 546,047, for improvements in carafes, there is shown an article embodying a plurality of walls, each of these walls being in the form of a container itself, each container including an upper and lower half section, having meeting flanges formed thereon adapted to be welded together. In another application upon the method of manufacturing metal bottles as shown in the above mentioned application, and filed by me on even date herewith, one of the stages therein includes the welding operation for the meeting flanges of the upper and lower sections forming the inner wall of the bottle.

In this process application, I have pointed out that the inner wall of the receptacle is interiorly coated with enamel, by fusion or the like, this enamel coating stage being preliminary to the welding operation. Heretofore, in the manufacture of bottles similar to the one shown in my application No. 546,447, it has been customary to enamel the inner wall of the receptacle subsequently to the welding operation, due to the fact that it is practically an impossibility to subject the sections of the inner wall to the welding operation after the sections have been enameled due to the high degree of heat necessary in the welding operation, which high temperature has a tendency to crack or diffuse the enamel from the metal.

I have found it to be a great advantage in the manufacture of vacuum bottles to coat the sections, forming the inner wall of the receptacle, interiorly preliminary to the welding operation, for in practically every instance where the inner wall is first welded and then coated with enamel the enamel generally shows streaks and blisters due to the fact that when the bottle is placed in the oven for baking the enamel thereon, the steam which creates within the receptacle cannot advantageously escape through the small opening in the neck of the bottle.

It is therefore, the primary object of the present invention, to produce a device adapted for use during the welding stage in the method of manufacturing all metal vacuum bottles, wherein the welding operation may be successively carried on subsequently to the enameling stage without any danger whatsoever of the enamel cracking or blistering.

A further object of the invention is to provide a device adapted to surround the walls of the bottle section for preventing the welding tools from contacting therewith, the device being so arranged as to permit the meeting edges of the section to be properly welded.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout, The figure is a vertical cross sectional view of the device constructed in accordance with the present invention showing the elements embodying the device set up in position surrounding the walls of the receptacle to be welded, the receptacle being shown in elevation.

With specific reference to the drawing, there is shown a receptacle consisting of an upper and lower half section 1 and 2 respectively having formed upon their meeting edges radially extending annular flanges 1' and 2' which flanges are adapted to be welded together for forming a single receptacle as shown in the view, it being understood that the receptacle shown in this view is in reality the inner wall of the completed bottle and more fully shown in my above mentioned copending applications.

Surrounding the upper and lower sections forming the receptacle, there is shown a cooling chamber likewise formed of upper and lower half sections 3 and 4 respectively. Each of these sections are in the form of a hollow casting and are so shaped as to snugly engage upon the walls of the sections 1 and 2 forming the bottle. The lower section 4 is adapted to receive the similar lower section 2 of the bottle and the upper section 3 is adapted for positioning upon the upper section 1 of the receptacle, this upper section being provided with a central annular shaped opening 3' for permitting the ready positioning of this section upon the bottle section 1, the opening 3' permitting passage of the neck of the section 1 therethrough. The edges of the sections 3 and 4 of the cooling chamber contacting with the radially projecting annular flanges 1' and 2' of the upper and lower sections 1 and 2 respectively are suitably journaled as at 5 for permitting the said annular flanges of the bottle section to project outwardly of the walls of the cooling chamber for allowing the projecting portion thereof to readily undergo the welding operation.

As before mentioned the sections forming the cooling chamber are of a hollow casting providing for the reception of water or other cooling means to be received therein for consequently imparting a cooling effect to the walls thereof for subsequently maintaining the adjacent walls of the receptacle received therein in a cool state. Each of the sections 3 and 4 are provided with inlet and outlet openings 6 whereby a forced circulation of cooling fluid may be maintained therein, this cooling fluid being preferably water. From the above description it will be readily understood that the lower section 4 of the cooling chamber is adapted to receive therein the lower section 2 of the receptacle, the annular flange thereof engaging upon the upper edge of this section, at which time the top section 1 of the receptacle may be positioned upon the lower section for suitably receiving the upper section 3 of the cooling chamber. After the cooling chamber and the sections of the receptacle are positioned as shown in the drawing, a circulation of cooling medium is maintained in the sections forming the cooling chamber at which time the meeting flanges 1' and 2' of the sections 1 and 2 may be advantageously welded together without any possible chance of the side walls of the receptacle becoming heated due to the heat of the welding tool employed.

Minor changes may be made in the invention without departing from the spirit and scope thereof as claimed.

What is claimed as new is:—

1. In the art of welding metal receptacles of the type including an upper and lower half section having meeting marginal flanges, means positioned upon the receptacle for preventing the heating of the same while the marginal flanges undergo the welding operation, said means being so formed as to allow the said marginal flanges to project therefrom.

2. In the art of welding metal receptacles of the type including an upper and lower half section having meeting marginal flanges, means positioned upon the receptacle for preventing the heating of the same while the marginal flanges undergo the welding operation, said means comprising a chamber adapted to receive a cooling medium therein.

3. In the art of welding metal receptacles of the type including an upper and lower half section having meeting marginal flanges, means positioned upon the receptacle for preventing the heating of the same while the marginal flanges undergo the welding operation, said means comprising a chamber adapted to receive a cooling medium therein, and including an upper and lower half section having adjacent beveled edges for allowing the said marginal flanges of the receptacle to project therefrom.

In testimony whereof I affix my signature.

WALTER WAGNER.